United States Patent [19]

Sokolow

[11] 4,154,536
[45] May 15, 1979

[54] HIGH EFFICIENCY INJECTION MOLDING SCREW

[75] Inventor: Nickolas N. Sokolow, Cheshire, Mass.

[73] Assignee: Beloit Corporation, Beloit, Wis.

[21] Appl. No.: 818,442

[22] Filed: Jul. 25, 1977

[51] Int. Cl.² .............................................. B29B 1/10
[52] U.S. Cl. ..................................................... 366/90
[58] Field of Search ................... 366/81, 90, 319, 322, 366/323, 324; 425/204, 208

[56] References Cited

U.S. PATENT DOCUMENTS

| | | | |
|---|---|---|---|
| 2,765,490 | 10/1956 | Zona | 366/88 |
| 3,486,194 | 12/1969 | Parks | 425/204 |
| 3,518,721 | 7/1970 | Rukas et al. | 425/208 X |
| 3,524,222 | 8/1970 | Gregory et al. | 425/208 X |
| 3,587,450 | 6/1971 | Smith | 425/208 X |
| 3,652,064 | 3/1972 | Lehnen et al. | 425/208 X |
| 3,671,141 | 6/1972 | Kovacs | 259/9 X |
| 3,687,423 | 8/1972 | Koch et al. | 259/109 |
| 3,945,622 | 3/1976 | Sokolow | 259/191 |
| 3,998,438 | 12/1976 | Sokolow | 259/191 |

FOREIGN PATENT DOCUMENTS

| | | | |
|---|---|---|---|
| 942014 | 2/1974 | Canada | 425/208 |
| 2417116 | 10/1975 | Fed. Rep. of Germany | 425/208 |
| 73636 | 6/1970 | German Democratic Rep. | 425/208 |

OTHER PUBLICATIONS

"Plastics Processing-Guide to Methods, Machinery, and Auxiliary Equipment" — Copyright 1969, by McGraw-Hill, Inc., N.Y., N.Y., pp. 21 and 22.

*Primary Examiner*—Philip R. Coe
*Attorney, Agent, or Firm*—Hill, Gross, Simpson, Van Santen, Steadman, Chiara & Simpson

[57] ABSTRACT

A screw for use in the bore of an extruder barrel of a molding machine thermo-plastics material feeder has an intermediate section of circumferentially interrupted helical flights or screw threads with inclined ramps on the leading ends of the interrupted flights or threads effective to flatten unmelted lumps of plastics material for increasing the surface area thereof to enhance heat transfer for expediting melting of the material. The tapered ramps are preferably longitudinally grooved forming shallow pockets gripping the plastics material and shearing the lumps as they are wedged between the ramps and bore of the extruder barrel. The peripheries of the flights or screw threads are spaced from the bore of the extruder barrel to define extrusion gaps therebetween with the gaps diminishing in thickness from the inlet to the outlet ends of the screw section or zone. The screw section or zone is positioned intermediate the ends of the screw to receive the thermo-plastics material in a partially melted condition composed of about 50 percent molten flowable material and about 50 percent of solid material and the flights or screw threads of the section discharge fully melted thermo-plastics material to a cascading mixing section or zone having axially spaced barrier rings with advancing and reversing flight lengths. The reversing flights terminate radially inward from the bore of the extrusion barrel providing shear gaps to mix the molten material with the gaps decreasing in thickness from the inlet to the outlet ends of the mixing section.

20 Claims, 7 Drawing Figures

HIGH EFFICIENCY INJECTION MOLDING SCREW

FIELD OF THE INVENTION

This invention relates to screw-type extruders or injection feed devices for plastics molding machines and particularly deals with an extrusion screw for rotating in the bore of a heated barrel to receive solid plastics material in particulate form and discharge uniformly mixed molten thermo-plastics material to an outlet, such as a nozzle, wherein the screw has a longitudinal section receiving partially melted material composed of circumferentially interrupted flights or screw threads effective to flatten unmelted lumps of the plastics material to expedite melting.

BACKGROUND OF THE INVENTION

In extruders or feed devices for thermo-plastics materials, elongated screws are rotatable in the bore of a heated extrusion barrel to mix, plasticize, and advance the plastics material from a feeder discharging solid particulate plastics material, generally in the form of pellets, to an outlet orifice for the liquid melt to be fed into the mold cavity of a molding machine. The functions of mixing, plasticizing, and conveying the plastics material are controlled by variations in the pitch, thickness and lead of the screw vanes and by the root diameters of the shaft portion of the screw. To insure complete melting of small globules of plastics material and thorough mixing of the material before it is discharged, the screws of the known extruders have had to be very long with an L/D ratio up to 30:1.

SUMMARY OF THE INVENTION

The present invention now overcomes the necessity for greatly elongated extrusion screws by providing a screw section receiving partly melted material and having circumferentially interrupted flights with tapered leading ends forming ramps which trap and mash flat the unmelted globules of plastics material between the flights and the heated barrel. This section or zone of circumferentially interrupted flights or screw threads is positioned intermediate the ends of the screw to receive plastics material from upstream flights or screw threads in a partly melted condition composed of about 40 to 60 percent solids and about 60 to 40 percent flowable liquid melt. The section then discharges fully molten material to a cascading mixing section which repeatedly shears the melt to thoroughly mix and discharge a uniform molten mass to the outlet of the extruder.

A feature of the invention includes the formation of longitudinal grooves in the tapered leading ends or ramps of the circumferentially interrupted flights for trapping or gripping solid particles of the plastics material to wedge them between the bore of the barrel and the ramp for crushing the particles into flat shapes with extended surface areas providing enhanced heat transfer from the molten portion of the mix to expedite melting.

Another feature of the invention involves decreasing the space between the top of the ramps and the bore of the barrel progressively in the direction of flow of the plastics material.

Another feature of the invention is the provision of a cascade mixer downstream from the circumferentially interrupted screw thread section of the screw which divides and recombines flow into substreams and oscillates the melt and any remaining solid particles forcing them over intense shear planes.

The circumferentially interrupted helical threads or flights preferably have three equally spaced starting flights.

An object of the invention is, therefore, to decrease the lengths of extruder screws in plastics material feed and melting devices through the use of a screw section which flattens unmelted chunks of plastics material to increase their exposed surface areas to surrounding molten plastics material thereby expediting the melting of the remaining unmelted material.

The specific object of this invention is to provide an extruder screw with an intermediate section of circumferentially interrupted threads or flights having tapered leading end edges which flatten unmelted plastics material into thin shapes with extended surface areas for increasing the heat transfer between the unmelted and melted material.

Another object of the invention is to provide a high efficiency extruder screw for plastics material melting and feed devices which flatten unmelted plastic chunks in molten plastics material to expedite melting of the unmelted portion of the plastics mix.

A specific object of the invention is to provide a screw section for the screws of plastics extruders with circumferentially interrupted flights having tapered ramps with longitudinal grooves to grip chunks of plastics material for shearing the same into thin shapes with extensive surface areas for quick heat absorption from surrounding molten plastics material.

Another object of this invention is to provide an extruder screw with an intermediate section receiving partially molten plastics material to work the unmelted portion of the material into good heat transfer relation with the molten portion to expedite melting.

Other and further objects of the invention will become apparent to those skilled in this art from the following detailed description of the annexed sheets of drawings which, by way of a preferred example only, illustrate the best now known mode of the invention.

ON THE DRAWINGS

BRIEF DESCRIPTION OF THE PREFERRED EMBODIMENTS

Figure 1:
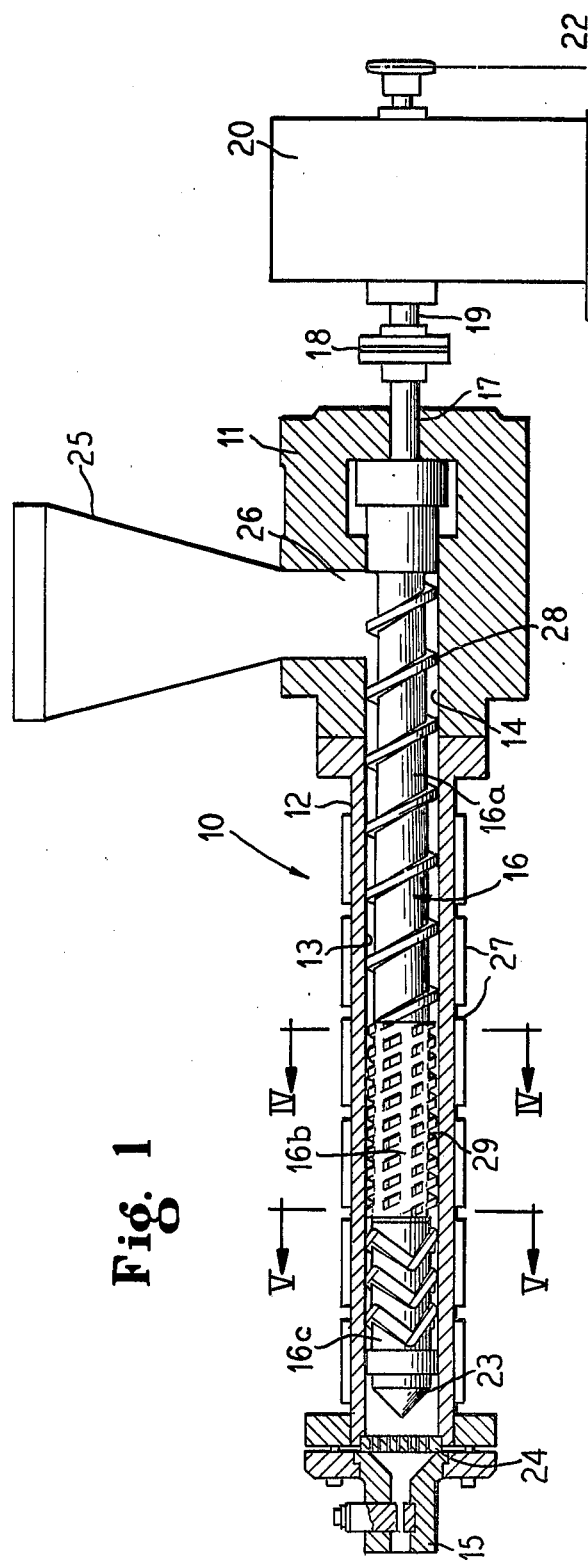
FIG. 1 is a vertical longitudinal cross-sectional view, with parts in side elevation of an extruder or injection molding feed device equipped with a high efficiency screw according to this invention.

The plastics material extruder or injection feed device 10 of FIG. 1 has a housing or body portion 11 with a forwardly projecting barrel 12 defining an elongated cylindrical bore 13 registering with a bore 14 in the housing at one end and with a nozzle outlet 15 at the other end. An elongated extrusion screw rod 16 is rotatably mounted in the bores 13 and 14 and is coupled at one end with a shaft 17 rotatably mounted in the housing 11 and projecting therefrom to a coupling 18 driven by a shaft 19 from a gear reduction unit 20 that is driven by an electric motor 21 through a chain and sprocket drive 22. The opposite end of the screw 16 is pointed as shown at 23 and terminates in the bore 13 adjacent a screen 24 at the entrance end of the nozzle 15.

A hopper or other feed device 25 supplies solid plastics material in particulate form, such as in the form of small pellets, through a feed throat 26 to the bore 14.

The elongated screw rod 16 can be divided into a plurality of sections or zones secured together in end to end relation including, for example, a feed and compression section 16a, the mixing and melting section 16b of this invention and the homogenizing and mixing cascade section 16c. Each section may have a threaded stud projecting from one end and a threaded well or recess in the other end for receiving the stud of an adjacent section.

Band heaters 27 surround the barrel 12 to heat the barrel for melting the plastics material being advanced through the bore 13 by the screw rod 16.

The first screw rod section 16a has screw flights or threads 28 riding in the bores 13 and 14 to feed plastics material from the throat 26. These flights may have any desired helical configuration and the root diameter of the rod portion of the screw rod may vary as desired to supply compressed partially melted plastics material to the screw section 16b.

Figure 2:
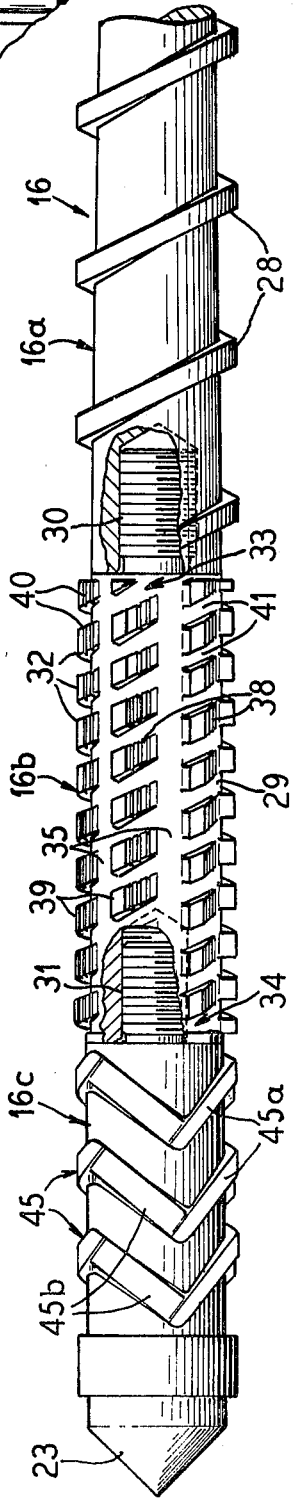
FIG. 2 is a fragmentary side elevational view with parts broken away in cross section to show underlying parts, the screw of FIG. 1 showing the section with the circumferentially interrupted flights or screw threads mounted between other sections according to this invention.
Figure 3:
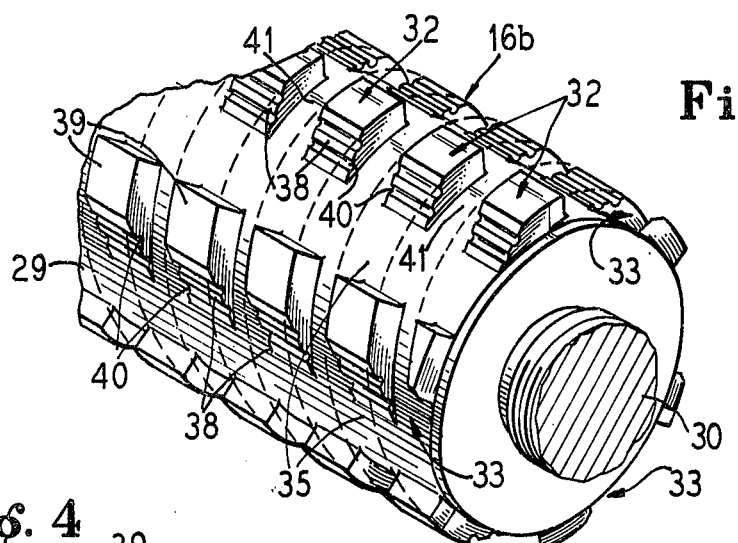
FIG. 3 is a fragmentary perspective view of the right hand end or entrance end of the interrupted flight screw section of FIG. 2.

As shown in FIGS. 2 and 3, the screw section 16b has a cylindrical base rod portion 29 of uniformed diameter along its length with a reduced diameter externally threaded stud 30 projecting from one end face thereof and an internally threaded recess or well 31 in the opposite end face thereof. The stud 30 is adapted to be threaded into a registering well of the screw section 16a while the well 31 is adapted to receive the threaded stud of the cascade screw section 16c.

Triple start helical flights or threads 32 provide three inlets 33 spaced one hundred and twenty degrees apart at the right hand or entrance end of the section 16b to receive half melted plastics material from the adjacent section 16a. The flights 28 of the section 16a force the partially molten plastics material into the entrance mouths 33 from which the material is advanced by the triple threads 32 to outlet ends 34, one hundred and twenty degrees apart at the left hand end of the section 16b.

Figure 4:
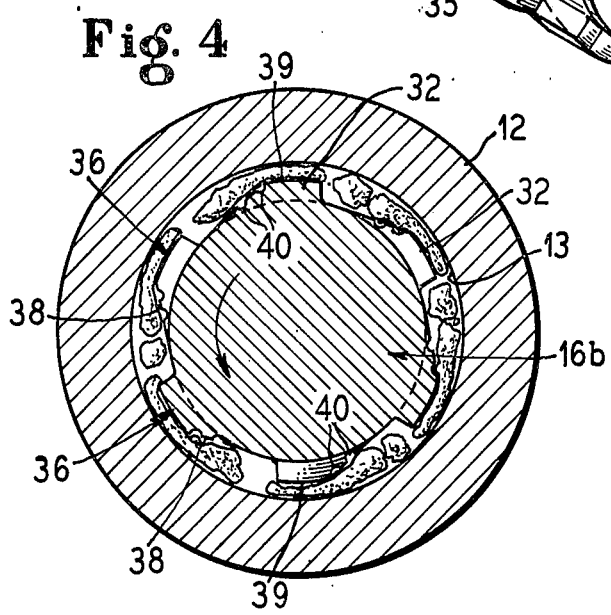
FIG. 4 is a transverse cross-sectional view taken along the line IV—IV of FIG. 1.
Figure 5:
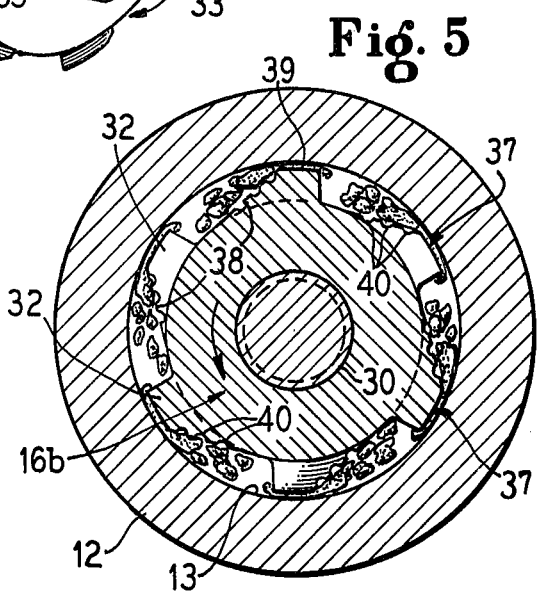
FIG. 5 is a transverse cross-sectional view taken along the line V—V of FIG. 1.

The threads 32 are equally spaced and have a lead to advance the partially melted plastics material at a rate which will insure complete melting of the material before it exits from the left hand end of the section. The threads are circumferentially fragmented by grooves or gaps 35 extending longitudinally along the full length of the section 16b to the depth of the base diameter 29 of the section. The radial height of the threads increases from the right to the left hand ends of the section for decreasing the gaps between the peripheries of the threads and the bore 13 of the barrel 12. Thus, as shown in FIG. 4, the gaps 36 between the peripheries of the flights or threads 32 at the right hand end of the section 16b are wider than the gaps 37 shown in FIG. 5 at the left hand end of the section 16b. By way of an example, a two-inch root diameter screw rod section may have threads or flights rising to a diameter of about 2⅛ inches at the right hand end of the rod section providing gaps of about ⅛ inch between the peripheries of the flights or threads and increasing gradually along the length of the section to decrease the gaps to about 1/16 inch at the left hand end.

The circumferentially separated sections of the threads have inclined leading ends or tapered ramps 38 extending tangentially from the base or root diameter 29 to the cylindrical peripheries 39 of the fragmented threads or flights. These ramps 38 have longitudinal grooves 40 providing pockets which will serve to grip the plastics material engaged thereby as the screw is rotated. The grooves 40 are quite shallow and have a fragmental cylindrical cross-section with open ends. The partially melted plastics material received into the inlet mouths 33 from the screw threads or flights 28 is advanced by the threads 32 in the channels 41 between the threads, but since these channels are connected by the longitudinal grooves 35, the material is engaged by the grooved ramps 38 and wedged between the ramps and bore 13 of the barrel to be flattened and extruded through the gaps between the peripheries 39 of the threads or flights and the bore 13 of the barrel 12. Any lumps of unmelted plastics material gripped by the inclined ramps is thus flattened and sheared into thin wafer shapes with extensive surface areas in heat transfer relation with the molten portion of the plastics material and with the heated bore 13 of the barrel. Melting of the unmelted lumps is thus expedited in the same manner as thin sections of crushed ice in water will melt faster than thicker cube sections.

Figure 6:
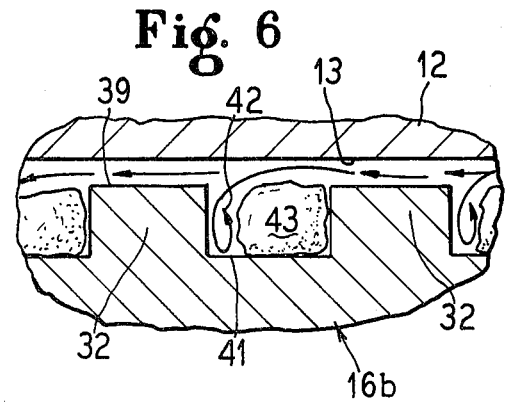
FIG. 6 is a diagrammatic view illustrating the condition of a half melted thermo-plastics material being advanced by the flights or screw threads of an extrusion screw.
Figure 7:
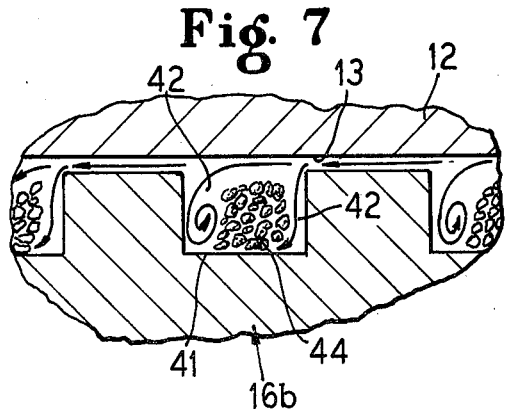
FIG. 7 is a view similar to FIG. 6 but showing the condition of the plastics material after it is more than half melted.

As shown in FIG. 6, the plastics material in the channel 41 between adjacent flights or threads 32 of the screw section 16b in the bore 13 of the barrel, when only about half melted, will have a molten leading portion 42 followed by a solid bed 43. As melting progresses to a condition where more than about 50 percent of the material in the channel 41 is molten, the solid bed 43 will break up as illustrated at 44 in FIG. 7 where loose chunks are formed in a broken bed of the solid material. Under these conditions, the molten material 42 flows into the bed to expedite melting of the chunks.

The screw zone or section of the present invention flattens the solid bed as it is breaking up to form very thin chunks with extended surface areas in intimate contact with the molten portion of the material thereby increasing the rate of heat transfer and speeding up the melting process. In addition, the flattened chunks are wedged into intimate heat exchange relation with the heated bore 13 of the barrel and are continually worked and squeezed to be extruded through the gaps between the bore of the barrel and the peripheries of the flights or threads.

The screw section 16b thus breaks up the solid beds of unmelted plastics material, works the chunks from these beds into flattened wafers, exposes the wafers to heat from surrounding molten portions of the melt and the heated barrel while continually shearing and tumbling the plastics material to increase heat transfer and render highly efficient the melting and plasticizing of the plastics material. Because of the efficiency of the screw section 16b, the overall length of the extruder screw may be greatly reduced.

Upon reaching the exiting end of the screw section 16b, the molten plastics material enters the cascade section 16c of the screw rod where successive bands of peripheral flights or threads 45 have advancing portions 45a and reversing portions 45b to "work" the melt into cascading streams for intimately mixing the same to discharge a uniform molten plastics material over the point of end 23 of the screw to the screen 24 for exiting the nozzle 15. The flight sections 45a ride in the bore 13 of the barrel while the flight sections 45b are of lesser height so that the plastics material may flow thereover in the gaps between these sections and the bore.

The cascading section 16c may have the flights of the type described and claimed in my U.S. Pat. No. 3,945,622 issued Mar. 23, 1976. The height of the reversing flights or thread sections 45b may increase in the successive bands 45 so that the gaps between these flight portions and the bore 13 of the barrel decrease.

From the above descriptions, it will, therefore, be understood that this invention provides a high efficiency injection molding screw having a section of circumferentially interrupted flights or screw threads receiving partially molten plastics material from upstream flights and effective to flatten and shear the unmelted plastics material to expedite melting so that a thoroughly molten plasticated mix is produced in a short screw length.

I claim as my invention:

1. A plastics material extruder which comprises an elongated cylindrical barrel, means for heating the barrel, a screw rod rotatably mounted in the bore of the barrel having screw threads advancing plastics material along the length of the barrel, said screw rod having an intermediate section of circumferentially interrupted threads with leading end edges located on the interrupted portion of said threads, and inclined ramps located on the leading end edges of the interrupted threads facing forwardly of and sloping radially outwardly in the direction of rotation of the screw rod to wedge plastics material against the bore of the barrel to flatten unmelted lumps of plastics material against the barrel to expedite melting of the unmelted portions of the plastics material.

2. A screw for use in the bore of a plastics material extruder which comprises a rod having a peripheral surface, helical flights on said rod for riding in said bore to advance plastics material through the bore of the extruder when the rod is rotated, said rod having an intermediate zone of circumferentially interrupted flights with leading ends located on the interrupted portion of said flights, and tapered ramps on the leading ends of the interrupted flights facing forwardly of the direction of rotation of the rod and sloping radially outward from the peripheral surface of the rod to the peripheries of the interrupted flights cooperating with the bore constructed and arranged to flatten lumps of unmelted plastics material for increasing heat transfer between melted and unmelted portion of the material.

3. In a screw for use in the bore of a plastics material extruder barrel, the improvement of a screw section intermediate the ends of said screw receiving partially melted plastics material from an upstream screw section, said screw section having a base, and circumferentially interrupted helical flights extending radially outward from the base to the peripheral portion of the flights and terminating radially inward from the bore of the barrel to provide extrusion gaps between the flights and barrel, and said flights having leading circumferential ends located on the interrupted portion of said flights facing forwardly of the direction of rotation of the screw and sloping upwardly from the base to said peripheral portions of the flights effective to engage plastics material in the gaps between the interrupted flights to press the material against the bore of the barrel for extrusion through said gaps as the screw is rotated in the barrel.

4. The extruder of claim 1, wherein said circumferentially interrupted threads terminate radially inward from the bore of said barrel to provide extrusion gaps between the peripheries of the threads and the bore of the barrel receiving the flattened lumps of plastics material from the inclined ramps.

5. The extruder of claim 1, including plastics material gripping recesses in the inclined ramps.

6. The extruder of claim 5, wherein said recesses extend longitudinally across said ramps in spaced parallel relation.

7. The extruder of claim 1, wherein said circumferentially interrupted threads have a plurality of starts providing separate entrance mouths receiving the plastics material.

8. The screw of claim 2, wherein the circumferentially interrupted flights terminate radially inward from the bore of the extruder providing extrusion gaps receiving the plastics material from the ramps.

9. The screw of claim 8, wherein said flights increase in diameter along the length of the intermediate zone of the rod to decrease the gaps between the peripheries of the flights and the bore of the extruder.

10. The screw of claim 2, wherein the intermediate zone of the rod is detachably mounted between upstream and downstream rod sections.

11. The screw of claim 10, wherein the detachable zone portion of the rod has an internally threaded recess at one end thereof and an externally threaded stud extending from the other end thereof for attachment to the adjacent upstream and downstream sections of the rod.

12. The screw of claim 2, wherein said intermediate zone of circumferentially interrupted flights discharges to a cascading mixing section of the rod having advancing and retracting flight portions.

13. The screw of claim 2, wherein said intermediate zone of circumferentially interrupted flights is positioned in said rod to receive half melted plastics material and to discharge molten plastics material.

14. The screw of claim 2, wherein the circumferentially interrupted flights are separated by longitudinally extending gaps along the full length of the zone.

15. The screw of claim 2, wherein the tapered ramps extend tangentially from the peripheral surface of the rod.

16. The screw of claim 2, wherein the peripheries of the circumferentially interrupted flights are cylindrical.

17. The further improvement of claim 3, wherein the leading circumferential ends of the flights are longitudinally grooved to provide gripping surfaces for the plastics material.

18. The further improvement of claim 3, wherein the leading circumferential ends of the flights are inclined from the root to the peripheral diameters of the flights.

19. The further improvement of claim 3, wherein the extrusion gaps are decreased in thickness along the length of the screw section from the incoming to the outgoing ends of the section.

20. The still further improvement of claim 19, wherein the gaps decrease from about ⅛ inch to about 1/16 inch.

* * * * *